United States Patent
El-Antably et al.

(10) Patent No.: US 6,579,202 B2
(45) Date of Patent: Jun. 17, 2003

(54) LUBRICATION AND COOLING SYSTEM FOR POWER RECEIVING AND DELIVERY UNITS IN AN ELECTRO-MECHANICAL VEHICULAR TRANSMISSION

(75) Inventors: Ahmed Mostafa El-Antably, Indianapolis, IN (US); George Gerald Shafer, Jr., Anderson, IN (US); Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 31 days.

(21) Appl. No.: 09/737,692

(22) Filed: Dec. 18, 2000

(65) Prior Publication Data

US 2002/0077209 A1 Jun. 20, 2002

(51) Int. Cl.$^7$ .............................................. F16H 57/04
(52) U.S. Cl. ........................ 475/159; 475/161; 184/6.12
(58) Field of Search ................................. 475/159, 160, 475/161; 184/6.12, 11.1, 11.2, 11.3

(56) References Cited

U.S. PATENT DOCUMENTS

| | | | |
|---|---|---|---|
| 3,080,774 A | * 3/1963 | Nickerson et al. | 475/159 |
| 3,387,502 A | * 6/1968 | Tourneau | 475/159 |
| 3,426,623 A | * 2/1969 | Abbott | 475/159 |
| 4,241,622 A | * 12/1980 | Kubo et al. | 475/159 |
| 4,278,928 A | * 7/1981 | Griffiths et al. | 475/159 |
| 5,111,090 A | 5/1992 | Otake et al. | 310/54 |
| 5,607,371 A | * 3/1997 | Yamaguchi | 475/159 |
| 5,682,074 A | 10/1997 | Di Pietro et al. | 310/215 |
| 5,791,193 A | * 8/1998 | Uematsu et al. | 475/159 |
| 5,931,757 A | 8/1999 | Schmidt | 475/2 |
| 6,068,565 A | * 5/2000 | Riemer et al. | 474/18 |

FOREIGN PATENT DOCUMENTS

EP 0980994 A2 2/2000

* cited by examiner

Primary Examiner—Richard M. Lorence
Assistant Examiner—Ha Ho
(74) Attorney, Agent, or Firm—Leslie C. Hodges

(57) ABSTRACT

Lubrication and cooling assemblies particularly adapted for use with power receiving and delivery units that concentrically circumscribe planetary gear subsets encased in the housing of a vehicular transmission. Such assemblies utilize a source of pressurized lubricating and cooling fluid and employ a web plate extending transversely of the transmission housing. The web plate has an outer rim located in proximity to the transmission housing. A discharge chamber is provided in association with the web plate and is located in proximity to the outer rim. Fluid communication means penetrate the web plate to transfer pressurized fluid from the source of pressurized lubricating and cooling fluid to the discharge chamber. One or more spray rings define at least one wall of the discharge chamber, and one or more orifices penetrating the spray ring.

17 Claims, 7 Drawing Sheets

LUBRICATION AND COOLING SYSTEM FOR POWER RECEIVING AND DELIVERY UNITS IN AN ELECTRO-MECHANICAL VEHICULAR TRANSMISSION

TECHNICAL FIELD

The present invention relates broadly to vehicular transmissions. In general, the present invention relates to vehicular transmissions that utilize supplemental power receiving and delivery units which derive their power from an on-board source of electrical energy. More particularly, the present invention relates to electromechanical, vehicular transmissions wherein the interactive planetary gear subsets are operatively connected to an engine and one or more power receiving and delivery units. Specifically, the power receiving and delivery units may be motor/generators, or simply motors, each of which have stators and rotors.

BACKGROUND OF THE INVENTION

The purpose of a vehicular transmission is to provide a neutral, at least one reverse and one or more forward driving ranges that impart power from an internal combustion engine, and/or other power sources, by which to drive the members that deliver the tractive effort from the vehicle to the terrain over which the vehicle is being driven.

As explained in detail in U.S. Pat. No. 5,931,757 issued on Aug. 8, 1999, and assigned to General Motors Corporation, the challenge is to provide a power system that will operate at high efficiencies over a wide variety of operating conditions. Desirable electric variable transmissions should, therefore, leverage not only the benefits of a series, hybrid transmission for desirable low-average power duty cycles—i.e.: low speed start/stop duty cycles—but also the benefits of a parallel, hybrid transmission for high-average output power—i.e.: high speed duty cycles.

By way of background, the power supplied by the engine and the power supplied by the source of electrical energy are independently connected to the drive members in a parallel transmission arrangement. Perfecting a concept wherein multiple modes, or gear trains, are available for synchronous selection by an on-board computer to transmit power from the engine and/or selected supplemental power receiving and delivery units (such as motor/generators, or even motors per se) to the transmission output shaft, or shafts, results in a hybrid transmission having an extremely wide range of applications, the many beneficial results of which may be achieved by the use of an electromechanical transmission.

The electrical receiving and delivery units must transfer power from and, if batteries are employed as the source of electrical power, to the source of electrical energy in order to power the means by which to move the vehicle. If motor/generators are employed, the resulting power required properly to operate such a vehicle precludes a reduction in the size of the motor/generators. As such, a two-mode, compound-split, electromechanical transmission has been an excellent choice for use with many commercial vehicles, particularly inasmuch as such a transmission does provide a mechanical point in at least the first forward mode of operation, and that helps meet the cooling requirements at low vehicle speeds. By incorporating the present invention in an electromechanical transmission even further cooling is assured.

SUMMARY OF THE INVENTION

It is, therefore, one primary aspect of the present invention to provide new and novel, lubricating and cooling assemblies for an electro-mechanical transmission.

It is another aspect of the present invention provide new and novel lubricating and cooling assemblies, as above, that delivers a spray pattern which can be customized specifically to the structural arrangement of the specific electro-mechanical transmission in which any such lubricating and cooling assembly is employed.

It is a further aspect of the present invention to provide new and novel lubricating and cooling assemblies, as above, wherein effective lubricating and cooling is readily achieved when the power receiving and delivery units of the electro-mechanical transmission in which the lubricating and cooling assemblies are employed circumferentially circumscribe the planetary gear subsets of the transmission.

It is a still further aspect of the present invention to provide new and novel lubricating and cooling assemblies, as above, that permit an effective arrangement by which to share the planetary gearing lubricating and cooling fluid with the power receiving and delivery units of the electro-mechanical transmission in which the lubricating and cooling assemblies are incorporated.

It is an even further aspect of the present invention to provide new and novel lubricating and cooling assemblies, as above, whereby a cleated stator assembly can enhance the distribution of the lubricating and cooling fluid to the end windings of the stator and over the rotor of the power receiving and delivery units of the electro-mechanical transmission in which the lubricating and cooling assemblies are employed.

These and other aspects of the invention, as well as the advantages thereof over existing and prior art forms, which will be apparent in view of the following detailed specification, are accomplished by means hereinafter described and claimed.

By way of a general introductory description, lubricating and cooling assemblies embodying the concepts of the present invention are particularly adapted for use with power receiving and delivery units that concentrically circumscribe planetary gear subsets encased in the housing of a vehicular transmission. Such lubricating and cooling assemblies employ a source of pressurized lubricating and cooling fluid as well as web plate that extends transversely of the transmission housing. The web plate has an outer rim located in proximity to the transmission housing, and a discharge chamber is provided in association with the web plate and is preferably located in proximity to the outer rim thereof. Fluid communication means penetrate the web plate to transfer pressurized fluid from the source of pressurized lubricating and cooling fluid to the discharge chamber. A spray ring serves to define at least one wall of the discharge chamber, and one or more spray orifices penetrate the spray ring.

An electro-mechanical transmission such as that disclosed in the aforesaid '757 U.S. patent is particularly suited to employ lubricating and cooling assemblies embodying the concepts of the present invention. Such a transmission utilizes a plurality of planetary gear subsets, and each planetary gear subset has a plurality of components in the nature of an inner, sun gear, an outer, ring gear circumscribing the inner, sun gear and a plurality of planet gears rotatably mounted on a carrier such that the planet gears each simultaneously mesh with the inner, sun gear and the outer, ring gear of the planetary gear subset in which that carrier is incorporated.

Such a transmission may receive its operating power from several sources. There may be a prime mover power source in the nature of an internal combustion engine. There may be a source for providing electrical energy, and there may be one or more power receiving and delivery units such as, for example, motor/generators.

To acquaint person skilled in the arts most closely related to the present invention, a representative electro-mechanical transmission within which the new novel lubricating a d cooling assemblies may be employed need only be partially described. That is, a representative electro-mechanical transmission is described only in sufficient detailed to permit one skilled in the art to utilize lubricating and cooling assemblies embodying the concepts of the present invention with many other embodiments of a transmission having power receiving and delivery units without attempting to show all of the various forms and modifications of transmissions in which lubricating and cooling assemblies embodying the concepts of the present invention might be incorporated. Should one desire a more complete description of a typical vehicular transmission with which the lubricating and cooling assemblies can be beneficially employed, reference may be had to the aforesaid '757 U.S. Patent.

As such, the embodiments of lubricating and cooling assemblies shown and described herein are only illustrative, and as will become apparent to those skilled in these arts can be modified in numerous ways within the scope and spirit of the invention; the invention being measured by the appended claims and not by details of the specification.

DESCRIPTION OF THE PREFERRED EMBODIMENT

Figure 1:
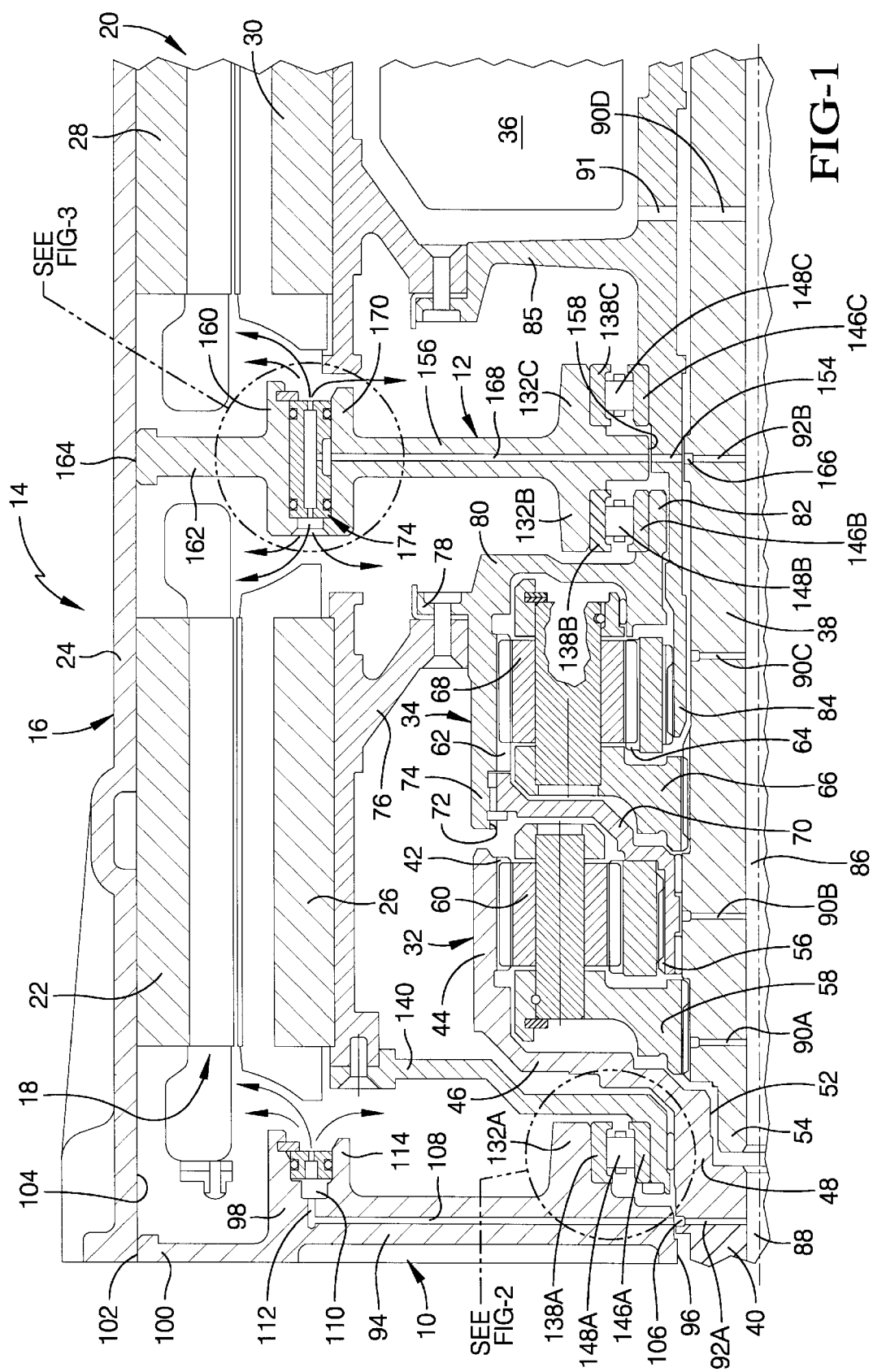
FIG. 1 is a diagrammatic, cross sectional representation of a portion of a representative electro-mechanical transmission depicting two lubricating and cooling assembly embodiments incorporating the concepts of the present invention.

Two representative lubricating and cooling assemblies embodying the concepts of the present invention are designated generally by the numerals 10 and 12 in FIG. 1 where they are employed within an electro-mechanical transmission 14 such as that to which the '757 U.S. Patent is directed.

With particular reference to FIG. 1, it will be observed that an electro-mechanical transmission 14 is contained within a housing 16. First and second power receiving and delivery units 18 and 20 are also contained within the housing 16. The power receiving and delivery units 18 and 20 may be motor/generators that, when operating as motors, provide power to the hybrid transmission 14. Typically, motor/generators may receive electric power from an electrical power may be one or more rechargeable batteries. Other devices that have the ability to store and dispense electric power may be used in place of the batteries without altering the concepts of the present invention. In fact, with some modifications, even a source of electrical power such as a fuel cell may be utilized, in which situation the power receiving and delivery units 18 and 20 would need to perform only as motors and not as generators. Whatever arrangement is selected, the power receiving and delivery unit 18 would employ a stator 22 that may be secured interiorly of a cylindrical wall 24 which defines the housing 16. A rotor 26 is rotatably received within the stator 22. The power receiving and delivery unit 20 would similarly employ a stator 28 that may also be secured to the cylindrical interior of the housing wall 24. A rotor 30 is rotatably received within the stator 28.

The lubricating and cooling assembly 10 could be employed to lubricate and cool one axial end portion of a power receiving and delivery unit—unit 18, as depicted. The lubricating and cooling assembly 12 could be employed to lubricate and cool adjacent, and opposed, ends of two axially disposed power receiving and delivery units—i.e.: the end of the power receiving and delivery unit 18 opposite to that end served by lubricating and cooling assembly 10 as well as the opposed end portion of the power receiving and delivery unit 20, as depicted.

Figure 2:
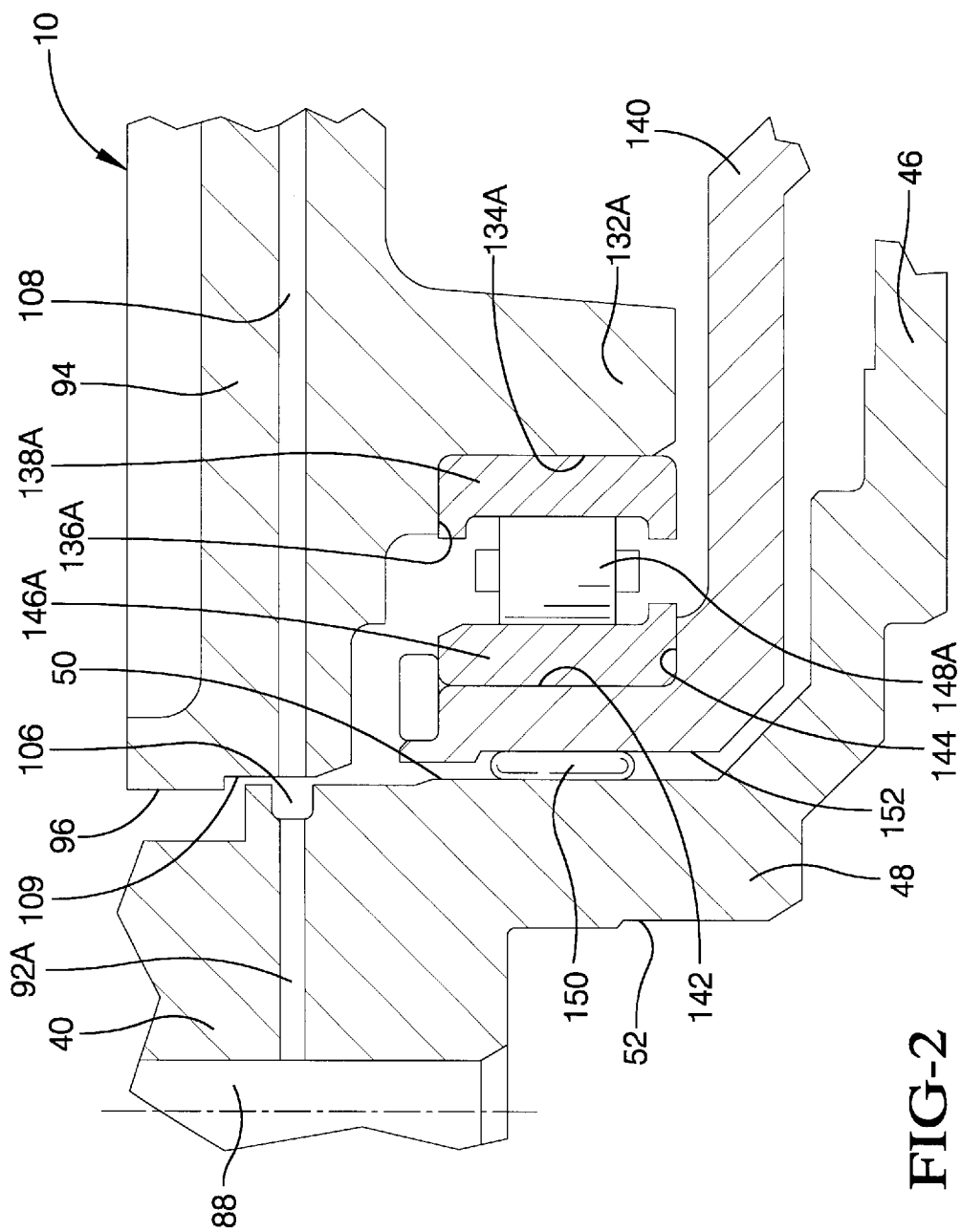
FIG. 2 is an enlarged portion of FIG. 1, also in cross section, defined by the chain-line circle in FIG. 1 designated as SEE FIG. 2.

An electromechanical transmission 14 would typically employ a plurality of planetary gear subsets including, for example, the two subsets 32 and 34 depicted and a third subset 36 schematically designated in FIG. 1 but not depicted in detail. All three such planetary gear subsets may circumscribe a central main shaft 38 to provide a concentric arrangement, if desired. One end of the central main shaft 38 may be axially aligned with in input shaft 40 that may, as is well known to the art, be driven by an internal combustion engine (not shown). As depicted, the planetary gear subset 32 may employ an outer gear member 42, typically designated as the ring gear, that may be presented interiorly of a cylindrical hub 44 which projects axially from the outer extremity of a dished plate 46 that, generally speaking, extends radially outwardly from the cylindrical inboard end portion 48 of the input shaft 40. With reference also to FIG. 2 it can be seen that the axially stepped, cylindrical outer surface 50 of the inboard end portion 48 may be of greater diameter than the remainder of the input shaft 40 to interface more conveniently with the lubricating and cooling assembly 10 as well as with the rotor 26 of the first power receiving and delivery unit 10, as will be hereinafter more fully explained. Moreover, the inboard end portion 48 may present an axially oriented, cylindrical, journal socket 52 that rotatably receives an axially disposed orienting and aligning spindle 54 on the outboard end of the central main shaft 38 (FIG. 1).

As also depicted in FIG. 1, the outer, ring gear 42 of the first planetary gear subset 32 circumscribes an inner gear member 56, typically designated as the sun gear. A carrier assembly 58 rotatably supports a plurality of planet gears 60 that simultaneously, and meshingly, engage both the outer, ring gear member 42 and the inner, sun gear member 56 of the first planetary gear subset 32.

The second planetary gear subset 34 would typically also employ an outer ring gear 62 that circumscribes an inner sun gear 64. A carrier assembly 66 rotatably supports a plurality of planet gears 68 that simultaneously, and meshingly, engage both the outer ring gear 62 and the inner, sun gear 64.

The first and second planetary gear subsets 32 and 34 may be compounded in that the sun gear 56 of the first planetary gear subset 32 is conjoined to the ring gear 62 of the second planetary gear subset 34. With continued reference to FIG. 1, a radially extending, axially stepped connector plate 70 extends radially outwardly from the inner, sun gear 56 of the first planetary gear subset 32 to be secured to the radially inner surface 72 of an annular extension 74 that projects axially from the outer, ring gear 62 of the second planetary gear subset 34.

A conical connector plate 76 that is secured to the rotor 26 of the first power receiving and delivery unit 18 is connected to a flange 78 that extends radially outwardly from the outer, ring gear 62 of the second planetary gear subset 34. A balance arm 80 extends radially inwardly from the outer ring gear 62 to terminate in an annulus 82 that rotatably encases the central main shaft 38 of the transmission 14 as well as a portion of the sleeve shaft 84 that also circumscribes the central main shaft 38. The sleeve shaft 84 supports the ring gear 64 of planetary gear subset 34 and is connected to the rotor 30 of the second power receiving and delivery unit 20 by an arm 85 that extends radially outwardly from the sleeve shaft 84, as depicted herein and as described in detail in the '757 U.S. Patent.

The first and second planetary gear subsets 32 and 34 may be disposed concentrically inwardly of the first power receiving and delivery unit 18, and the third planetary gear subset 36 may be similarly disposed concentrically inwardly of the second power receiving and delivery unit 20. The details of the third planetary gear subset 36 are not depicted inasmuch as the structure thereof is not critical to the concept of the present invention and because the details, if desired, are also fully disclosed and described in the aforesaid '757 U.S. Patent.

In the transmission 14 depicted, within which the exemplary embodiment of lubricating and cooling assembly 10 is disclosed, the central main shaft 38 is provided with an axially extending supply bore 86 that is preferably aligned with an axially extending supply bore 88 in the input shaft 40. The bores 86 and 88 comprise pressurized supply passages by which the lubricating and cooling liquid is delivered to the lubricating and cooling assemblies 10 and 12 as well as to the rotating members in the planetary gear subsets 32, 34 and 36. The pump means by which pressurization is effected as well as the use of axial bores within the shafts 38 and 40 are well known to the art, and for that reason the pump means was not depicted. Conventional feeder passages 90A, 90B and 90C intersect the axial bore 86 and extend radially to dispense the pressurized lubricating and cooling fluid to the planetary gear subsets 32 and 34. At least one additional radial supply passage 90D may similarly dispense lubricating and cooling fluid to the third planetary gear subset 36 through a radial feeder passage 91 that penetrates the sleeve shaft 84 radially inwardly of planetary gear subset 36.

Unique to the present concept are the radial feeder passages 92A and 92B that penetrate the input shaft 40 and the central main shaft 38, respectively.

As apparent from the previous two paragraphs, a particular structural member, component or arrangement may be employed at more than one location. When referring generally to that type of structural member, component or arrangement, a common numerical designation is employed. However, when one of the structural members, components or arrangements so identified is to be individually identified, it will be referenced by virtue of a letter suffix employed in combination with the numerical designation employed for general identification of that structural member, component or arrangement. Thus, there are at least four radial feeder passages which are generally identified by the numeral 90, but the specific, individual radial feeder passages are, therefore, identified as 90A, 90B, 90C and 90D in the specification and on the drawings. Similarly, there are at least two radial feeder passages which are generally identified by the numeral 92, but the specific, individual radial feeder passages are, therefore, identified as 92A and 92B in the specification and on the drawings. This same suffix convention shall be employed throughout the specification.

Figure 4:
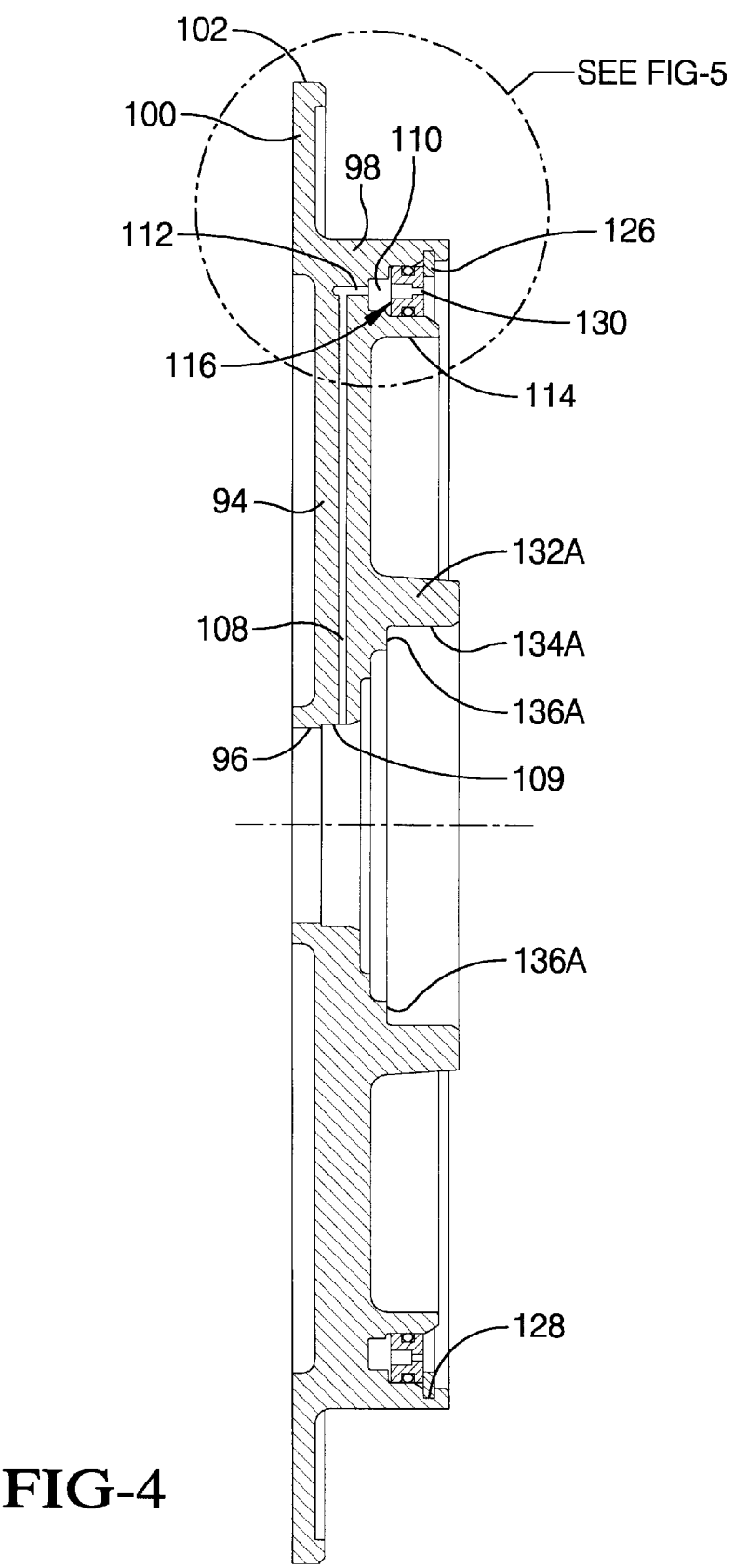
FIG. 4 is an enlarged, cross section of one of the lubricating and cooling assemblies depicted in FIG. 1.

As shown in FIGS. 1 and 4, as well as in part in FIG. 2, the lubricating and cooling assembly 10 comprises a web plate 94 that extends radially from its annular, innermost surface 96 to an intermediate rim 98 in the form of an annulus located radially outwardly with respect to the inner surface 96 of the web plate 94. A peripheral flange, identified generally by the numeral 100, may be axially offset with respect to the web plate 94 and extend radially outwardly from the intermediate rim 98. The radially outer extremity of the peripheral flange 100 presents boundary edge 102 that may engage the cylindrical interior surface 104 of the transmission wall 24.

As depicted in FIGS. 1 and 2, the radial feeder passage 92A may terminate in an annular feeding chamber 106. With continued reference to FIGS. 1, 2 and 4, one or more distribution passages 108 penetrate an annular inner surface 109 of the web plate 94. The annular surface 109 may be radially offset in relation to the annular innermost surface 96. The distribution passages 108 extend radially outwardly to communicate either directly with an annular discharge chamber 110 or, as depicted, indirectly through a cross bore 112. With reference particularly to FIGS. 1, 4, 5 and 6, the discharge chamber 110 may be recessed into the intermediate rim 98 or, if desired, into the web plate 94 radially inwardly of the intermediate rim 98. In the still further structural option depicted, an annular flange 114 may extend axially outwardly from the web plate 94 concentrically inwardly of the intermediate rim 98 to define the discharge chamber 110 therebetween.

Figure 5:
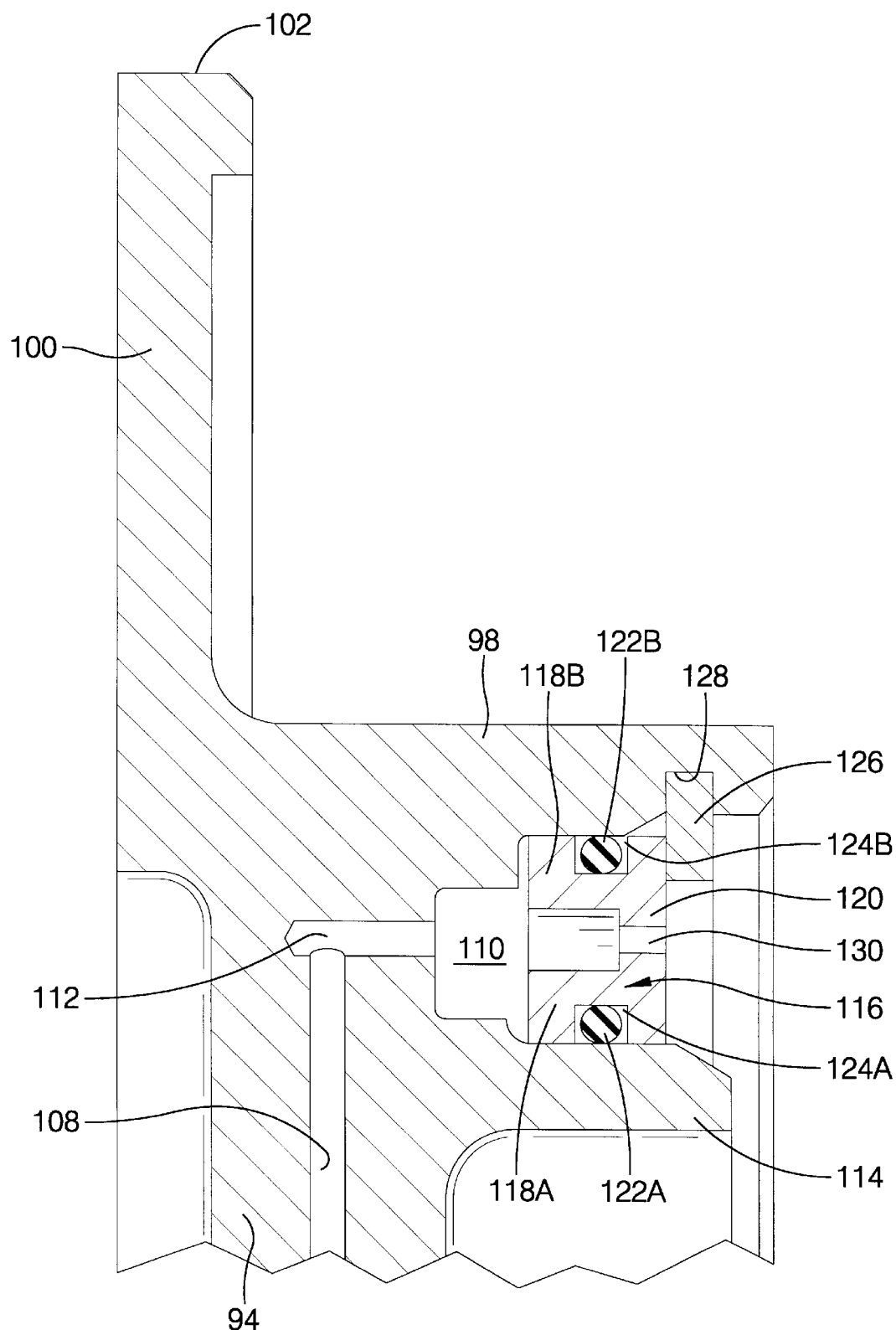
FIG. 5 is a further enlarged portion of FIG. 4, also in cross section, defined by the chain-line circle in FIG. 4 designated as SEE FIG. 5.
Figure 6:
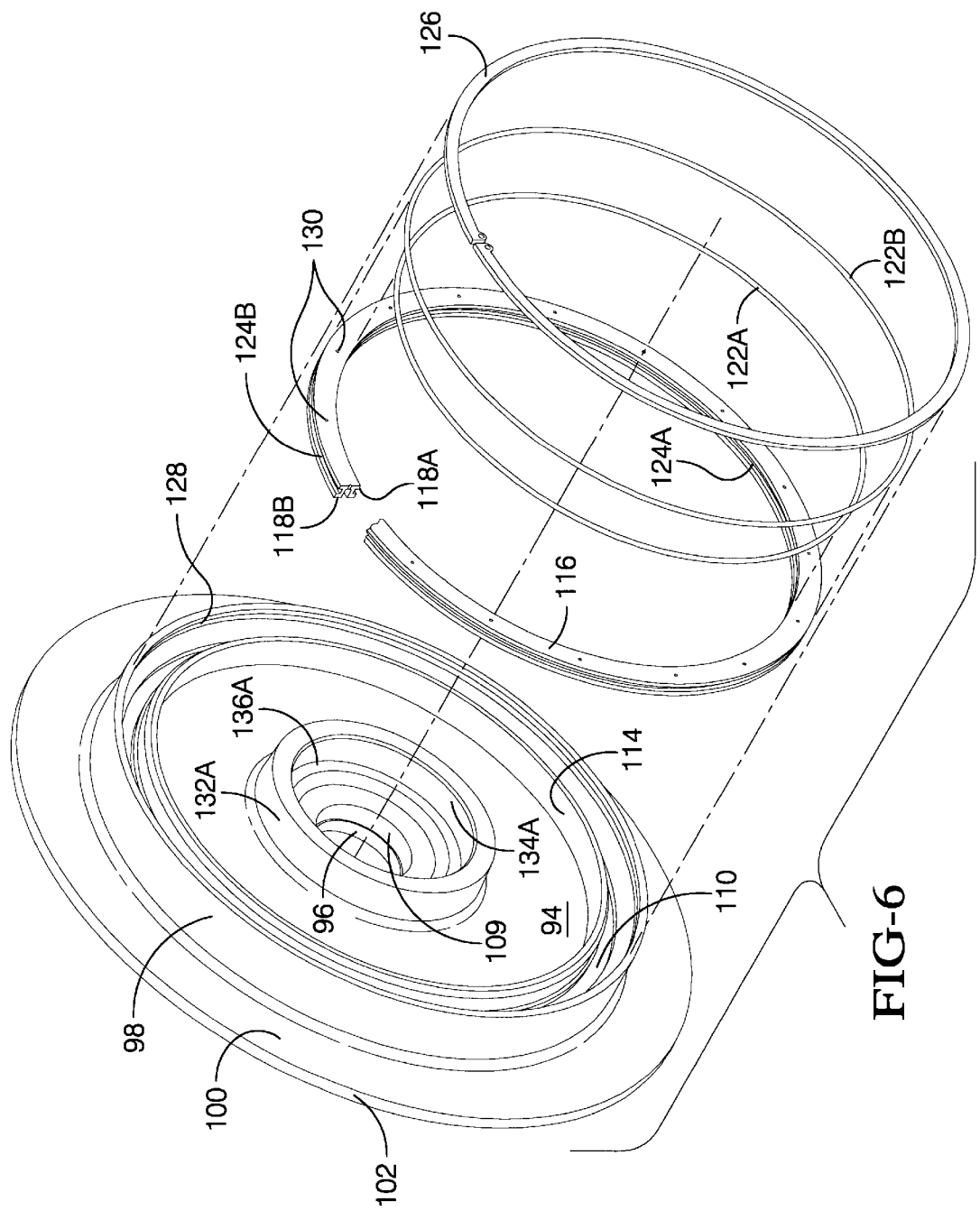
FIG. 6 is an exploded perspective of that lubricating and cooling assembly depicted in both FIGS. 1 and 4 to depict the sealing and retention members utilized in conjunction with the spray ring secured within the discharge chamber of that lubricating and cooling assembly; and, FIG. 7 is a diagrammatic representation, similar to FIG. 1 but depicting a representative electro-mechanical transmission incorporating a variation in the manner by which the lubricating and cooling fluid may be introduced into lubricating and cooling assemblies incorporating the concepts of the present invention.

With continued particular reference to FIGS. 5 and 6, a spray ring 116 having a U-shaped cross section may be insertably received within the discharge chamber 110 located between the intermediate rim 98 and the annular flange 114. The U-shaped spray ring 116 has two radially spaced, annular side walls 118A and 118B that are joined by a transverse base plate 120. When received within the discharge chamber 110 the spray ring 116 defines an axial wall for the discharge chamber 110. A radially inner O-ring 122A may be received within a recess 124A in the side wall 11 8A of the spray ring 116 to engage the flange 114 and effect a seal that is capable of precluding the passage of fluid between the spray ring 116 and the flange 114. A similar, outer O-ring 122B, may be received within a recess 124B in the side wall 118B of the spray ring 116 to engage the intermediate rim 98 and thereby effect a seal that is capable of precluding the passage of fluid between the spray ring 116 and the intermediate rim 98.

The spray ring 116 may be secured within the discharge chamber 110 between the intermediate rim 98 and the flange 114 by an interior snap ring 126 that is received within an annular recess 128 on the interior of the intermediate rim 98.

One or more orifices 130 penetrate the transverse base plate 120 of the spray ring 116 to spray the lubricating and cooling fluid received within the discharge chamber 110 onto the stator 22 and rotor 26 of the first power receiving and delivery unit 10.

The lubricating and cooling assembly 10 does not rotate. Moreover, the engagement of the boundary edge 102 thereof with the cylindrical inner surface 104 of the transmission housing wall 24 precludes movement of the lubricating and cooling assembly 10 laterally with respect to the axis (roughly coextensive with the disposition of the central main shaft 38) of the transmission housing 16. As such, the lubricating and cooling assembly 10 may serve to stabilize the rotor 26 of power receiving and delivery unit 18 from undesirable lateral movement, or vibrations, within the housing 16. To that end, and with particular reference to FIGS. 1, 2, 4 and 6, the lubricating and cooling assembly 10 may be provided with a hub portion 132A, the interior of which presents, at least in part, a cylindrical surface 134A that extends axially from a radially disposed abutment wall 136A to receive and position a bearing race 138A. A stabilizing disk 140 is secured to, and extends radially inwardly from, the rotor 26 to provide a cylindrical ledge surface 142 (FIG. 2) and a radially extending abutment wall 144 that receives and positions a bearing race 146A so as to be disposed concentrically inwardly with respect to race 138A in order to receive an appropriate bearing member 148A therebetween. Needle bearings 150 may be provided between the radially innermost cylindrical surface 152 presented from the stabilizing disk 140 and the axially stepped, cylindrical exterior surface 50 on the inboard end portion 48 of the input shaft 40.

With continued reference to FIG. 1 it will be recognized that lubricating and cooling assembly 12 is employed to lubricate and cool the opposed, facing ends of power receiving and delivery units 18 and 20, whereas lubricating and cooling assembly 10 is employed to lubricate and cool only the opposite end of power receiving and cooling unit 18. Accordingly, it would be readily feasible to substitute two lubricating and cooling units 10 disposed back-to-back in a manner that would permit them to lubricate and cool the opposed, facing ends of power receiving and delivery units 18 and 20. Such an arrangement would, of course, require that appropriate feeder passages 90 be supplied in the central main shaft 38 and that some means, such as the hereinafter described connecting passage 154, allow the pressurized lubricating and cooling fluid to flow radially through the sleeve shaft 84.

Returning to the description of the lubricating and cooling assembly 12, it too may utilize a radially extending web plate 156 that extends radially outwardly from its radially innermost, annular surface 158 to an intermediate rim 160 in the form of an annulus that projects axially outwardly of the web plate 156. A peripheral flange 162 extends radially outwardly from the intermediate rim 160 as though it were an extension of the web plate 156. The radially outer extent of the peripheral flange 162 presents a boundary edge 164 that engages the cylindrical interior surface 104 of the transmission housing wall 24.

Like the lubricating and cooling assembly 10, the lubricating and cooling assembly 12 does not rotate. Moreover, the engagement of the boundary edge 164 thereof with the cylindrical inner surface 104 of the transmission housing wall 24 precludes movement of the lubricating and cooling assembly 12 laterally with respect to the axis (roughly coextensive with the disposition of the central main shaft 38) of the transmission housing 16.

As such, the lubricating and cooling assembly 12 may cooperate with the lubricating and cooling assembly 10 to stabilize the rotor 26 of power receiving and delivery unit 18. That is, the lubricating and cooling assembly 12 may be provided with a hub portion 132B, the interior of which (like the hub portion 132A) presents, at least in part, a cylindrical surface 134 that extends axially from a radially disposed abutment wall 136 to receive and position a bearing race 138B. The balance arm 80 that extends between the rotor 26 and the annulus 82 supports a bearing race 146B disposed concentrically inwardly of the bearing race 138B in order to receive an appropriate bearing member 148B therebetween.

The lubricating and cooling assembly 12 may also serve to at least assist in the stabilization of the rotor 30 in power receiving and delivery unit 20. That is, the lubricating and cooling assembly 12 may also be provided with a hub portion 132C, the interior of which also presents (like hub portions 132A and 132B) at least in part, a cylindrical surface 134 that extends axially from a radially disposed abutment wall 136 to receive and position a bearing race 138C. The sleeve shaft 84 which, as previously explained, is connected to the rotor 30 by an arm 85 such that the sleeve shaft 84 supports a bearing race 146C disposed concentrically inwardly of the bearing race 138C in order to receive an appropriate bearing member 148C therebetween in order to at least assist in the stabilization of the rotor 30 in power receiving and delivery unit 20 from undesirable lateral movement, or vibrations, within the housing 16.

Turning to the fluid communication means employed by lubricating and cooling assembly 12, at least one feeder passage 92B may also terminate in an annular feeding chamber 166 that circumscribes the central main shaft 38. The connecting passage 154, which penetrates the sleeve shaft 84, is preferably aligned to communicate with the feeding chamber 166 so as to allow unrestricted flow of pressurized fluid out through the feeder passage 92B as well as the connecting passages 154 and into a distribution passage 168 that opens through the radially innermost annular surface 158 on the web plate 156. The distribution passage 168 extends radially outwardly through web plate 156 to open through a flanged annulus 170 disposed concentrically inwardly of the intermediate rim 160.

Figure 3:
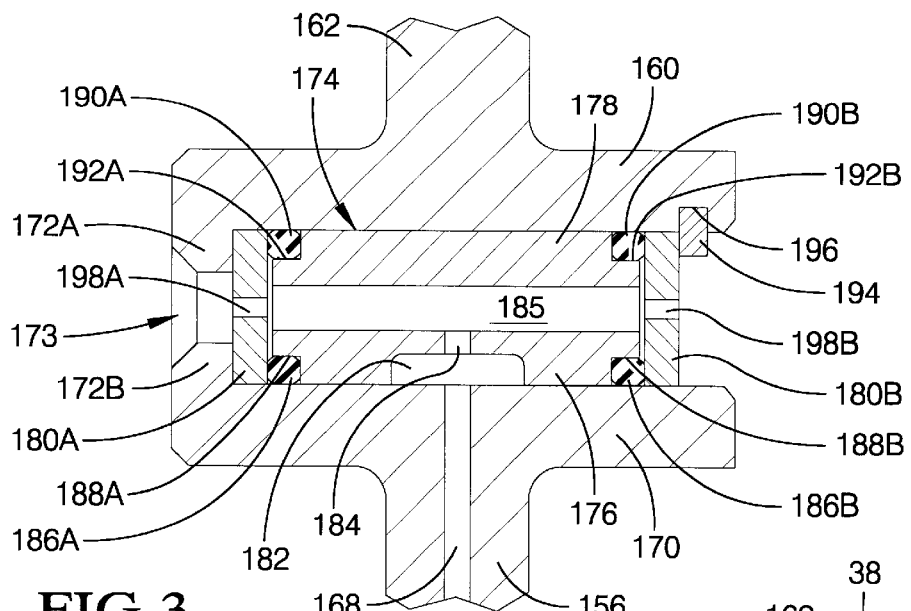
FIG. 3 is also an enlarged portion of FIG. 1, in cross section, defined by the chain-line circle in FIG. 1 designated as SEE FIG. 3.

As best seen in FIG. 3, a first positioning flange 172A may extend radially inwardly from the intermediate rim 160 in opposition to a second positioning flange 172B that extends radially outwardly from the annulus 170. The purpose of the positioning flanges 172 will be hereinafter more fully described. It should be observed that the positioning flanges 172 may be conjoined, at least at one axial end, by a latticed grille 173 that provides both structural integrity between the radially displaced intermediate rim 160 and the annulus 170, while permitting the passage of fluid, particularly as a spray, therethrough.

The spray ring 174 depicted in conjunction with lubricating and cooling assembly 12 may, in effect, comprise a conjoined composite of the two spray rings 116 disposed back-to-back. As such, the spray ring 174 may have a radially inner, annular side wall 176 and a radially outer annular side wall 178, each of which may comprise an annulus—the two annular side walls 176 and 178 being concentrically disposed. A transverse base plate 180A may be disposed at one axial end of each side wall 176 and 178, and a second transverse base plate 180B may be disposed at the other end of each side wall 176 and 178.

The radially innermost side of the inner side wall 176 may be provided with an annular recess that constitutes an accumulation chamber 182. One or more ports 184 effect communication between the accumulation chamber 182 and the discharge chamber 185 disposed between the concentric side walls 176 and 178.

O-rings 186A and 186B may be received upon corresponding recessed ledges 188A and 188B at the axially opposite ends of, and on the radially inner boundary of the annular side wall 176 to engage not only the annulus 170 and thereby effect a seal that is capable of precluding the axial passage of fluid between the spray ring 174 and the annulus 170 as well as between the end plates 180 and either the side wall 176 or the flanged annulus 170. Similar O-rings 190A and 190B may be received upon corresponding recessed ledges 192A and 192B at the axially opposite ends of, and on the radially outer boundary of the annular side wall 178 to engage not only the intermediate rim 160 and thereby effect a seal that is capable of precluding the axial passage of fluid between the spray ring 174 and the intermediate rim 160 as well as between the end plates 180 and either the side wall 178 or the intermediate rim 160.

The spray ring 174 may be secured between the intermediate rim 160 and the annular flange 170 by an interior snap ring 194 that is received within an annular recess 196 on the interior of the intermediate rim 160. That is, the snap ring 194, in combination with the positioning flanges 172A and 172B, enbracingly engage the spray ring 174 and secure it against axial movement. At this point it should be appreciated that as an alternative arrangement a second snap ring (not shown) may be substituted for the positioning flanges 172A and 172B.

Irrespective of how the spray ring 174 is secured, one or more spray orifices 198A may penetrate the transverse base plate 180A of the spray ring 174 to spray the lubricating and cooling fluid received within the discharge chamber 185 onto the stator 22 and rotor 26 of the first power receiving and delivery unit 18. Similarly, one or more orifices 198B may penetrate the transverse base plate 180B of the spray ring 174 to spray the lubricating and cooling fluid received within the discharge chamber 185 onto the stator 28 and rotor 30 of the second power receiving and delivery unit 20.

Figure 3B:
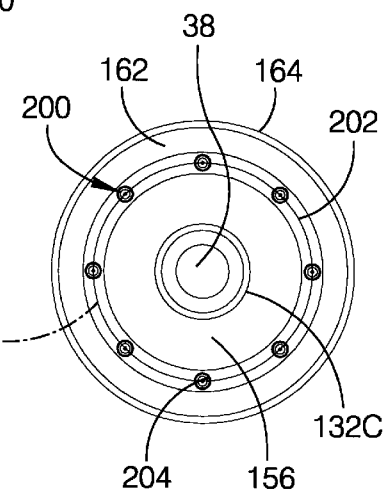
FIG. 3B is an elevational view of a lubricating and cooling assembly adapted to receive a plurality of spray rings such as that depicted in FIG. 3A.
Figure 3A:
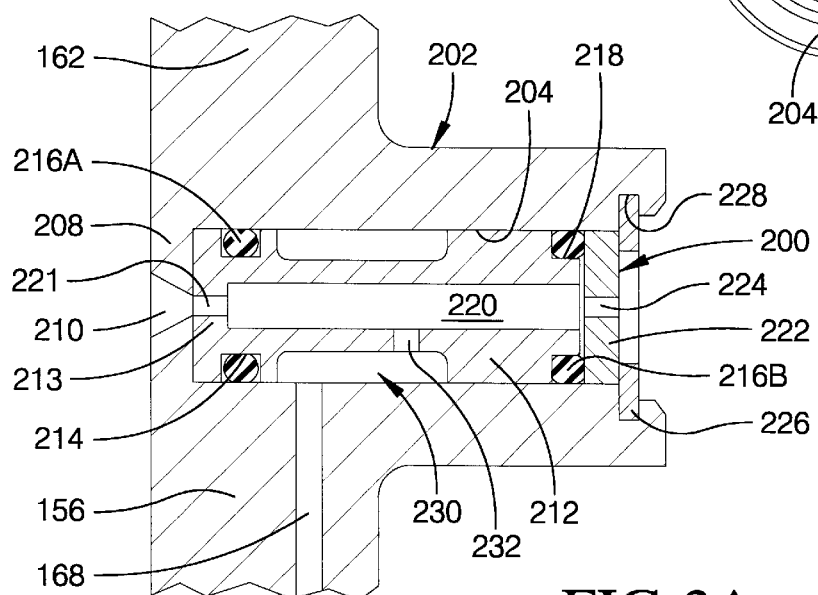
FIG 3A is a view similar to FIG. 3 but depicting a further variation for a spray ring that may be employed in a lubricating and cooling assembly embodying the concepts of the present invention.

With reference now to FIGS. 3A and 3B, it will be observed that a plurality of spray ring plugs 200 may be substituted for the unified annular spray ring 174. As such, the intermediate rim 160 and the annulus 170 are conjoined into a unified annulus 202 provided with a series of bores 204 that are circumferentially spaced along a reference circle 206. Each bore 204 will terminate at a transverse retaining shoulder 208 that is itself penetrated by a dispersion bore 210 that may, if desired, be flared, as depicted.

Each individual spray ring plug 200 may have a cylindrical, outer wall 212 that is receivable within the bore 204, with a transverse base plate 213 at one end of the wall 212 adapted to engage the retaining shoulder 208. An annular recess 214 circumscribes the outer wall 212 a moderate distance from the transverse base plate 213 that engages the retaining shoulder 208, and an O-ring 216A is received within the recess 214. At the opposite end of the wall a recessed ledge 218 circumscribes the wall 212 and receives an O-ring 216B. The purpose of the two-rings 216 will be hereinafter more fully described.

The wall 212 circumscribes a discharge chamber 220, and the transverse base plate 213 is penetrated by a spray orifice 221. A closure plate 222, that is penetrated by a spray orifice 224, engages that end of the wall 212 at which the O-ring 216B is located. The closure plate 222 as well as the spray ring plug 200 in its entirety are held within the cylindrical bore 204 by an internal snap ring 226 that is removably received within an annular recess 228 in the bore 204.

The medial portion of the exterior surface on the outer wall 212 may be circumscribed by an axially extending recess 230 that serves as an accumulation chamber which extends not only radially between the outer wall 212 of the spray ring plug 200 and the surface of bore 204 but also axially between the O-rings 216A and 216B. One or more ports 232 penetrate the outer wall 212 to effect communication between the accumulation chamber 230 and the discharge chamber 220.

At this point one can appreciate that the O-rings 216 not only seal the accumulation chamber 230 against loss of fluid between the outer, annular wall 212 and the bore 204 but also seal the discharge chamber 220, particularly at the juncture of the closure plate 222 with the annular outer wall 212.

One preferred structural arrangement has heretofore been disclosed by which to distribute the pressurized lubricating and cooling fluid to not only the planetary gear subsets 32, 34 and 36 but also the power receiving and delivery units 18 and 20 through supply bores 86 and 88 in the central main shaft 38 and the input shaft 40, respectively. The supply bores 86 and 88 in the axial shafts 38 and 40 are commonly employed to delivery the lubricating fluid to the planetary gear subsets.

It is, however, also within the scope of the present invention to utilize a supply bore 236 (FIG. 7) that is provided within a manifold 238 which extends along the exterior surface 240 of the transmission housing wall 24. The axial extent of the manifold 238 as well as the extent to which the manifold circumferentially circumscribes the transmission housing wall 24 will depend upon the desired number of locations at which the lubricating and cooling fluid is to be introduced into modified lubricating and cooling assemblies 10A and 12A.

At this point it should be explained that when two quite similar, or nearly identical, structural components are distinguished by only a relatively few structural differences, the highly similar components will be identified by the same numerical designator, even though the differences may be significant. The first to be described component shall be identified simply by a discrete numerical designator, but the second to be described, similar structural member shall bear the same numerical designation in combination with a letter subscript. Hence, whereas the spray ring assemblies in FIG. 1 are identified by the numerical designations 10 and 12, the highly similar, but different, spray ring assemblies depicted in FIG. 7 shall be identified as 10A and 12A, respectively. Those common structural features incorporated in both assemblies 10 and 10A as well as those common structural features incorporated in both assemblies 12 and 12A shall be identified by the same numerical designation but those features that constitute the distinguishing elements shall bear their own distinct numerical designator.

Before continuing with the specific description of assemblies 10A and 12A it should be noted that irrespective of whether the supply bores are disposed within the shafts 38 and 40 or within the manifold 238, the lubricating and cooling fluid may be pressurized by a well known pump, not shown.

Figure 7:
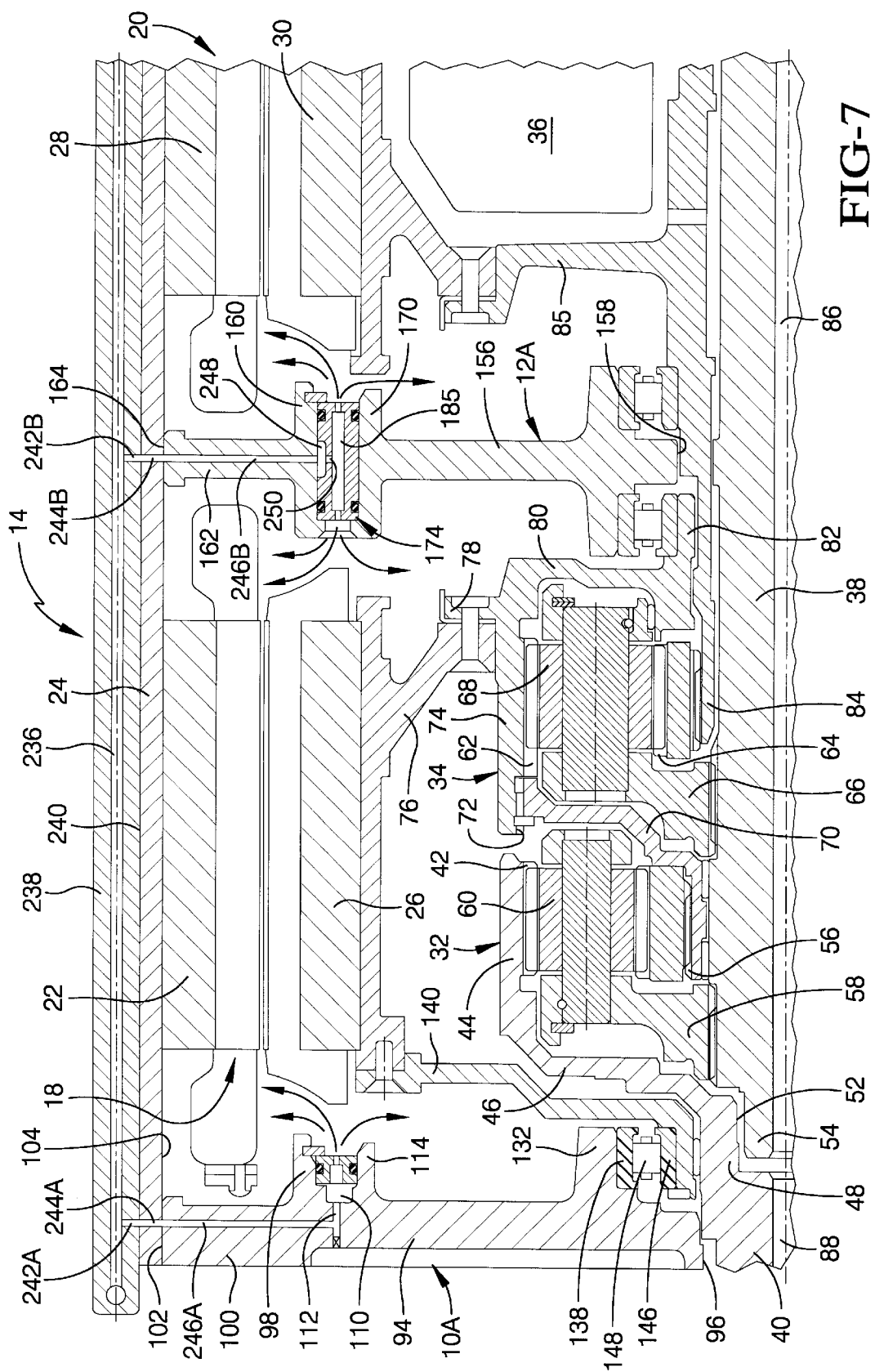

With continued reference to FIG. 7 and the description of the lubricating and cooling assembly 10A, a feeder port 242A penetrates the manifold 238 in alignment with a linking passage 244A that penetrates the housing wall 24. A distribution passage 246A penetrates the boundary edge 102 of the peripheral flange 100 in general alignment with the linking passage 244A and extends radially inwardly through the web plate 94 to intercept the cross bore 112 that feeds the discharge chamber 110. Except for the fluid communication means described above, the lubricating and cooling assembly 10A may otherwise be identical to the lubricating and cooling assembly 10.

Turning now to the lubricating and cooling assembly 12A, also depicted in FIG. 7, a feeder port 242B penetrates the manifold 238 in alignment with a linking passage 244B that penetrates the housing wall 24. A distribution passage 246B penetrates the boundary edge 164 of the peripheral flange 162 in alignment with the linking passage 244B and extends radially inwardly to intercept an annular recess in the outer side wall 178 that constitutes an accumulation chamber 248. One or more ports 250 effect communication between the accumulation chamber 248 and the discharge chamber 185. Except for the fluid communication means described in this paragraph, the lubrication and cooling assembly 12A may otherwise be identical to the lubricating and cooling assembly 12 and will, therefore, serve to lubricate and cool the opposing ends of the power receiving and delivery units 18 and 20.

SUMMATION

As shown and described, a variety of fluid communications means are employed to transfer lubricating and cooling fluid from a well known pump to the hereinbefore described discharge chambers that effect the desired spray through the orifices in the spray rings incorporated in the several embodiments of the lubricating and cooling assemblies shown and described. In the first embodiment of the lubricating and cooling assembly 10 depicted in FIG. 1 the fluid communication means includes the successive passages from the supply bore 88 to the discharge chamber 110—i.e.: the radially extending feeder passages 92A in the input shaft 40, the feeding chamber 96, one or more distribution passages 108 and, the optional cross bore 112 in the web plate 94.

In the second embodiment of the lubricating and cooling assembly 12 depicted in FIG. 1 the fluid communication means includes the successive passages from the supply bore 86 to the discharge chamber 185—i.e.: the radial feeder passage 92B in the central main shaft 38 and one or more distribution passages 168 in the web plate 162.

In FIG. 7 the fluid communication means includes the successive passages from the supply bore 236 and through the feeder ports in the manifold 238 as well as the linking passages 244 in the transmission housing wall 24 and into the distribution passages 246 in the web plate 162 to the discharge chamber 185. It may, of course, be necessary to utilize a separate distribution passage for each discharge chamber 110 or 185.

CONCLUSION

While only a preferred embodiment of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention teaches that lubricating and cooling assemblies embodying the concepts of the present invention are not only particularly suited for cooling power receiving and delivery units in electromechanical vehicular transmissions but are also are capable of sharing the lubricating and cooling fluid used with the planetary gear subsets as well as fulfilling the remaining aspects of the invention.

What is claimed is:

1. A lubricating and cooling assembly particularly adapted for use with power receiving and delivery units that are encased in a housing of a vehicular transmission, said assembly comprising:

a source of pressurized lubricating and cooling fluid;

a web plate extending transversely of the transmission housing;

said web plate having an outer rim adapted to engage the transmission housing;

a discharge chamber provided in association with said web plate and located in proximity to said outer rim;

said discharge chamber defined by a unified annulus located radially inwardly with respect to the outer rim of said web plate and extending axially from said web plate;

fluid communication means at least a portion of which extends radially within said web plate to transfer pressurized fluid from said source of pressurized lubricating and cooling fluid to said discharge chamber;

a plurality of bores circumferentially spaced along a reference circle on the axial extent to which said unified annulus extends axially of said web plate;

each said bore terminating in a transverse retaining shoulder;

each said bore adapted to receive a spray ring plug; and one or more orifices penetrating a wall of said discharge chamber to dispense a spray of the lubricating and cooling fluid onto one or more of said power receiving and delivery units located in proximity to said spray ring plug.

2. A lubricating and cooling assembly, as set forth in claim 1, further comprising:

an intermediate rim in the form of an annulus extending axially of said web plate in general proximity to an outer edge;

an annular flange located concentrically inwardly of said intermediate rim and also extending axially outwardly of said web plate; and, said discharge chamber disposed at least in part between said intermediate rim and said annular flange.

3. A lubricating and cooling assembly, as set forth in claim 2, wherein said spray ring plug comprises:

concentrically spaced annular side walls conjoined by a transverse base plate to provide a U-shaped cross section;

said base plate being provided with one or more of said orifices;

sealing means being interposed between said annular side walls of said spray ring and said intermediate rim as well as said annular flange; and, means to secure said spray ring plug between said intermediate rim and said annular flange.

4. A lubricating and cooling assembly, as set forth in claim 1, further comprising:

an intermediate rim in the form of an annulus extending axially of said web plate in general proximity to an outer edge;

an annular flange located concentrically inwardly of said intermediate rim and also extending axially outwardly of said web plate;

a first positioning flange extending radially inwardly from said intermediate rim;

a second positioning flange extending radially outwardly from said annular flange;

said positioning flanges conjoined by a latticed grille to provide structural integrity between said intermediate rim and said annular flange while permitting the passage of fluid therebetween;

said spray ring plug having radially inner and radially outer, annular side walls;

each said side wall having first and second axial ends;

a transverse base plate disposed at each axial end of said side walls;

each said base plate penetrated by one or more orifices;

said discharge chamber disposed radially between said annular side walls;

said fluid communication means including not only an accumulation chamber recessed into at least one annular side wall on the opposite radial side of said side wall relative to said discharge chamber but also one or more ports effecting communication between said accumulation and said discharge chamber; and, sealing means interposed between said side walls of said spray ring and at least a portion of said intermediate rim, said annular flange and said base plates.

5. A lubricating and cooling assembly, as set forth in claim 4, wherein:

the axial ends on the annular side walls of said spray ring plug present recessed ledges in opposition to said adjacent intermediate rim and said adjacent annular flange; and, sealing means received on said recessed ledges to engage the adjacent surfaces of said base plates as well as said adjacent intermediate rim and said annular flange.

6. A lubricated and cooling assembly, as set forth in claim 1, wherein:

each said spray ring plug has a cylindrical outer wall that circumscribes said discharge chamber;

one end of said discharge chamber terminates in a transverse base plate that is penetrated by one of said orifices;

when said spray ring plug is operatively received within said bore that axial end of said spray ring plug at which said transverse base plate is located engages said retaining shoulder;

a closure plate, also penetrated by said one of said orifices, defines the end of said discharge chamber opposite said transverse base plate; and means are provided selectively to secure said spray ring plug within said bore and in engagement with said retaining shoulder.

7. A lubricating and cooling assembly, as set forth in claim 1, further comprising:

a hub having an annular surface defining at least a portion of its radially inner boundary;

said radially inner surface of said hub circumscribing shaft member extending axially with respect to said transmission housing;

at least one supply bore extending axially of said shaft member; and radially feeder passages connecting each said supply bore with said fluid communicating means that penetrate said web plate.

8. A lubricating and cooling assembly, as set forth in claim 7, wherein:

said feeder passages connect with said fluid communicating means through said annular surface defining a portion of the radially inner boundary of said hub.

9. A lubricating and cooling assembly, as set forth in claim 8, wherein said fluid communication means comprises:

at least one distribution passage extending between said annular surface defining a radially inner boundary of said hub and said discharge chamber.

10. A lubricating and cooling assembly, as set forth in claim 9, wherein:

a cross bore communicates between at least one radially oriented distribution passage and said discharge chamber.

11. A lubricating and cooling assembly, as set forth in claim 1, wherein:

said housing has an outer wall with an exterior surface;

a manifold extends at least partially along said exterior surface of said transmission outer wall;

a supply bore extends within said manifold;

a feeder port penetrates said manifold to communicate with said supply bore therein; and, at least one linking passage penetrates said outer wall of said transmission housing to communicate between said feeder port and said fluid communication means within said web plate.

12. A lubricating and cooling assembly, as set forth in claim 11, wherein:

said fluid communication means includes a distribution passage that penetrates the outer rim of said web plate to communicate with said discharge chamber.

13. A lubricating and cooling assembly, as set forth in claim 12, wherein:

a cross bore is interposed between said distribution passage and said discharge chamber.

14. A lubricating and cooling assembly, as set forth in claim 12, wherein:

said fluid communication means includes an accumulation chamber that communicates with said distribution passage; and said accumulation chamber communicates with said discharge chamber by a port member.

15. A lubricating and cooling assembly particularly adapted for use with power receiving and delivery units that are encased in the housing of a vehicular transmission, said assembly comprising:

a source of pressurized lubricating and cooling fluid;

a web plate extending transversely of the transmission housing;

said web plate having an outer rim adapted to engage the transmission housing;

a discharge chamber provided in association with said web plate and located in proximity to said outer rim;

said discharge chamber defined by a unified annulus located radially inwardly with respect to the outer rim of said web plate and extending axially from said web plate;

fluid communication means penetrating said web plate to transfer pressurized fluid from said source of pressurized lubricating and cooling fluid to said discharge chamber;

a plurality of bores circumferentially spaced along a reference circle on the axial extent to which said unified annulus extends axially of said web plate;

each said bore terminating in a transverse retaining shoulder;

each said bore adapted to receive a spray ring plug;

each said spray ring plug has a cylindrical outer wall that circumscribes said discharge chamber;

one end of said discharge chamber terminates in a transverse base plate that is penetrated by one of said orifices;

when said spray ring plug is operatively received within said bore, that axial end of said spray ring plug at which said transverse base plate is located engages said retaining shoulder;

a closure plate, also penetrated by one of said orifices, defines the end of said discharge chamber opposite said transverse base plate;

means are provided selectively to secure said spray ring plug within said bore and in engagement with said retaining shoulder;

one or more orifices penetrating a wall of said discharge chamber to dispense a spray of the lubricating and cooling fluid onto one or more of said power receiving and delivery units located in proximity to said spray ring plug;

an accumulation chamber is recessed within the exterior of said outer wall; and said accumulation chamber communicates with said discharge chamber through port means that penetrate said outer wall.

16. A lubricating and cooling assembly, as set forth in claim 15, further comprises:

a recess circumscribes said outer wall between said base plate and said accumulation chamber; and sealing means are received within said recess to preclude fluid passing form said accumulation chamber along said bore toward that end of said spray ring plug defined by said base plate.

17. A lubricating and cooling assembly, as set forth in claim 16, wherein:

a recessed ledge circumscribes said outer wall adjacent said closure plate; and said sealing means are received on said recessed ledge to preclude the passage of fluid from said accumulation chamber along said bore toward that axial end of said spray ring plug defined by said closure plate as well as precluding fluid flow between said outer wall and said closure plate.

* * * * *